United States Patent
Imamiya

(10) Patent No.: US 6,958,102 B2
(45) Date of Patent: Oct. 25, 2005

(54) METHOD AND SYSTEM FOR PRODUCING UNVULCANIZED-RUBBER/STEEL-WIRE COMPOSITES

(75) Inventor: Susumu Imamiya, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 140 days.

(21) Appl. No.: 09/958,741

(22) PCT Filed: Feb. 21, 2001

(86) PCT No.: PCT/JP01/01252

§ 371 (c)(1),
(2), (4) Date: Dec. 13, 2001

(87) PCT Pub. No.: WO01/62460

PCT Pub. Date: Aug. 30, 2001

(65) Prior Publication Data

US 2002/0170654 A1 Nov. 21, 2002

(30) Foreign Application Priority Data

Feb. 23, 2000 (JP) .................................. 2000-046224

(51) Int. Cl.⁷ ......................... B29C 65/00; B32B 31/04
(52) U.S. Cl. .................. 156/177; 156/178; 156/264; 156/433; 156/439; 156/441; 156/512
(58) Field of Search ................................ 156/177, 178, 156/264, 433, 439, 441, 512; 264/171.11, 171.15; 425/114

(56) References Cited

U.S. PATENT DOCUMENTS

| | | | |
|---|---|---|---|
| 1,800,179 A | * | 4/1931 | Darrow |
| 2,512,762 A | | 6/1950 | Benson et al. |
| 3,082,292 A | * | 3/1963 | Gore |
| 3,486,962 A | | 12/1969 | Gallagher |
| 3,728,424 A | * | 4/1973 | Bauer |
| 3,842,643 A | * | 10/1974 | Large et al. .................. 72/286 |
| 3,852,875 A | * | 12/1974 | McAmis et al. |
| 4,219,601 A | | 8/1980 | Inoue et al. |
| 4,329,397 A | * | 5/1982 | Zamek et al. |
| 4,769,202 A | * | 9/1988 | Eroskey et al. |
| 5,009,732 A | * | 4/1991 | Ikeda et al. |
| 5,338,380 A | * | 8/1994 | Yutori et al. ................. 148/532 |
| 5,575,866 A | * | 11/1996 | Minamida et al. |
| 5,651,246 A | | 7/1997 | Kusaba |
| 6,082,163 A | * | 7/2000 | Hara |
| 6,280,556 B1 | * | 8/2001 | Okada et al. |

FOREIGN PATENT DOCUMENTS

| | | | |
|---|---|---|---|
| EP | 958913 | | 11/1999 |
| WO | WO 99/24244 | * | 5/1999 |

OTHER PUBLICATIONS

European Search Report for co-pending application mailed on Apr. 1, 2005.

* cited by examiner

*Primary Examiner*—Steven D. Maki
(74) *Attorney, Agent, or Firm*—Rader, Fishman & Grauer PLLC

(57) ABSTRACT

In a method of the present invention for producing an unvulcanized-rubber/steel-wire composite, steel wires are continuously drawn, and the drawn steel wires are not taken up but fed to a rubber coater so that the steel wires are coated with unvulcanized rubber. An apparatus of the present invention for producing an unvulcanized-rubber/steel-wire composite comprises a wire drawer for drawing steel wires continuously, and a rubber coater for coating the steel wires with unvulcanized rubber, and the steel wires drawn by the wire drawer are not taken up but are led to the rubber coater.

9 Claims, 5 Drawing Sheets

METHOD AND SYSTEM FOR PRODUCING UNVULCANIZED-RUBBER/STEEL-WIRE COMPOSITES

TECHNICAL FIELD

The present invention relates to a method and apparatus for producing an unvulcanized-rubber/steel-wire composite suited as a tire material or the like and, more particularly, to a method and apparatus for producing an unvulcanized-rubber/steel-wire composite, which can reduce the working cost drastically and can improve the fatigue resistance of steel wires and the adhesiveness between the wires and the rubber.

BACKGROUND OF THE INVENTION

The product such as tires or conveyor belts using the rubber/steel-wire composite usually uses a band-shaped unvulcanized-rubber/steel-wire composite, in which a plurality of steel wires are arranged in parallel and buried in unvulcanized rubber, as an intermediate material.

The steel wires to be used for those products are high-carbon steel wires containing carbon of 0.6 to 1.1 wt. % and have to be highly drawn for manifesting their high strength. In order to improve the adhesiveness between the steel wires and the rubber and to enhance the lubricity at the drawing time, on the other hand, it is ordinary to plate the steel wires with brass or zinc before the drawing treatment.

In the prior art, a number of steps have passed before the aforementioned steel wires are worked to a composite with the unvulcanized rubber. Specifically, the drawn steel wires are once taken up on bobbins so that a plurality of wires are twisted to a steel cord by a twister. This steel cord is taken with a predetermined length on a bobbin and is commercially available.

The rubber manufacturer produces a primary composite composed of the unvulcanized rubber and the steel cords, by purchasing a plurality of coils of steel cords, by setting the plurality of coils on a cord supplier called the "creel stand", by feeding the plurality of cords while arraying them to a rubber coater through guides or guide rolls. At this time, the band-shaped primary composites are taken up through a parting sheet of polyethylene or the like between the layers so that they are prevented from adhering with each other.

On the other hand, a secondary composite having an intrinsic width and cord angle is prepared by cutting the primary composite at a predetermined angle to a predetermined size and by jointing the end faces of the cuts to each other. At this time, the band-shaped secondary composites are taken up through a parting sheet of polyethylene or the like between the layers so that they are prevented from adhering with each other. Then, the secondary composite thus taken up is conveyed to an apparatus for shaping the tires or conveyor belts so that it is formed into unvulcanized products.

Thus, the method of the prior art is required to have many steps till the unvulcanized-rubber/steel-cord composite is produced from the starting materials, and is accompanied by a resultant problem the working cost is seriously raised. In order to lower this working cost, it is conceivable to speed up the drawing work of the steel wires. If the steel wires are drawn at a high drawing percentage and at a high speed, however, there arises a disadvantage that the steel wires drops in strength and in fatigue resistance.

On the other hand, the drawn steel wires are coated, just after drawn, with a plating layer but are oxidized on their surfaces if left as they are. There arises another problem that the adhesiveness between the wires and the rubber is degraded. In the prior art, the oxidation is prevented by adjusting the humidity of the place for stocking the steel cords, but this stocking management leads to a rise in the working cost.

An object of the present invention is to provide a method and apparatus for producing an unvulcanized-rubber/steel-wire composite, which can reduce the working cost drastically and can improve the fatigue resistance of the steel wires and the adhesiveness between the wires and the rubber.

DISCLOSURE OF THE INVENTION

In order to achieve the above-specified object, a method of the present invention for producing an unvulcanized-rubber/steel-wire composite is characterized by drawing steel wires continuously, and by not taking up but feeding said drawn steel wires to a rubber coater so that said steel wires are coated with unvulcanized rubber.

By thus coating the drawn steel wires as they are with the unvulcanized rubber, there are omitted the winding step after the drawing step, the twisting step, the winding step after the twisting step, the packaging step, the conveying step, the step of mounting the bobbins on the creel, and so on, which have been inevitably performed in the method of the prior art. Therefore, the energy consumption and the labor cost can be spared to reduce the working cost for the unvulcanized-rubber/steel-wire composite drastically.

On the other hand, the drawing work may be performed at a drawing speed as low as to synchronize with the rubber coating so that the heat to be generated when the steel wires slide on the die faces of the wire drawer can be suppressed. Even if the drawing percentage of the steel wires is raised, therefore, the strength and fatigue-resistance of the steel wires can be sufficiently retained.

Moreover, the drawn steel wires are provided, as they are to have their plated layers activated just after drawn, with the rubber coating so that they are prevented from being oxidized on their surface layers thereby to improve the adhesiveness between the wires and the rubber.

In order to achieve the above-specified object, on the other hand, an apparatus of the present invention for producing an unvulcanized-rubber/steel-wire composite is characterized: by comprising a wire drawer for drawing steel wires continuously, and a rubber coater for coating said steel wires with unvulcanized rubber; and in that the steel wires drawn by said wire drawer are not taken up but are led to said rubber coater.

In the present invention, the rubber coater may be fed with a plurality of steel wires or preferably ten to fifty steel wires in parallel. Specifically, it is preferred that a plurality of steel wires are drawn continuously and simultaneously, and that the plurality of drawn steel wires are not taken up but arrayed and fed to said rubber coater. In this case, a plurality of drawers may be arranged as said wire drawer in parallel so that the plurality of steel wires drawn by said drawers are not taken up but are arrayed and led to said rubber coater. Alternatively, at least one multi-die drawer for drawing three or more steel wires continuously and simultaneously is provided as said wire drawer so that the plurality of steel wires drawn by said multi-die drawer may not be taken up but arrayed and led to said rubber coater. Especially, the latter multi-die drawer can contributes to a compact structure of the apparatus and can control the feeding rate of the plurality of steel wires easily.

It is preferred that the drawing speed of said steel wires is 80 m/min. or less. As a result, it is possible to synchronize the drawing treatment and the rubber coating treatment, and to suppress the heat generation at the time when the steel wires slide on the die faces of the wire drawer. It is also preferred that the drawing percentage of said steel wires is 96% or more. As a result, it is possible to manifest a high strength in case high-carbon steel wires containing carbon of 0.6 to 1.1 wt. % are used as the steel wires. Here, the drawing percentage is determined from the sectional area $D_1$ of the steel wires before drawn and the sectional area $D_2$ after drawn and can be expressed by $(D_1-D_2)/D_1 \times 100$ (%).

In the present invention, on the other hand, said drawn steel wires are not taken up but may be fed to a wire reformer to reform said steel wires, and said reformed steel wires are not taken up but may be fed to said rubber coater. In this case, a wire reformer may be interposed between said wire drawer and said rubber coater for reforming said steel wires.

In the present invention, moreover, the primary composite of said steel wires coated with the unvulcanized rubber can be cut at a predetermined angle to a predetermined length, and the cuts can be spliced to each other to form a secondary composite. In this case, there may be further comprised a band worker including a cutter for cutting the primary composite having passed said rubber coater, at a predetermined angle to a predetermined length, and a splicer for splicing the plurality of cuts prepared by said cutter, to form a secondary composite.

The unvulcanized-rubber/steel-wire composite producing apparatus thus far described can be connected to the step of forming the product such as a tire or a belt conveyor. Especially if the production apparatus is connected directly to the tire forming machine, the pneumatic tire can be formed through from the material level such as the steel wires or the unvulcanized rubber so that the cost for producing the tire can be drastically lowered.

BRIEF DESCRIPTION OF THE DRAWINGS

FIG. 3 shows dies of the wire drawer of FIG. 1.

BEST MODE FOR CARRYING OUT THE INVENTION

The present invention will be described in detail with reference to the accompanying drawings.

Figure 1:
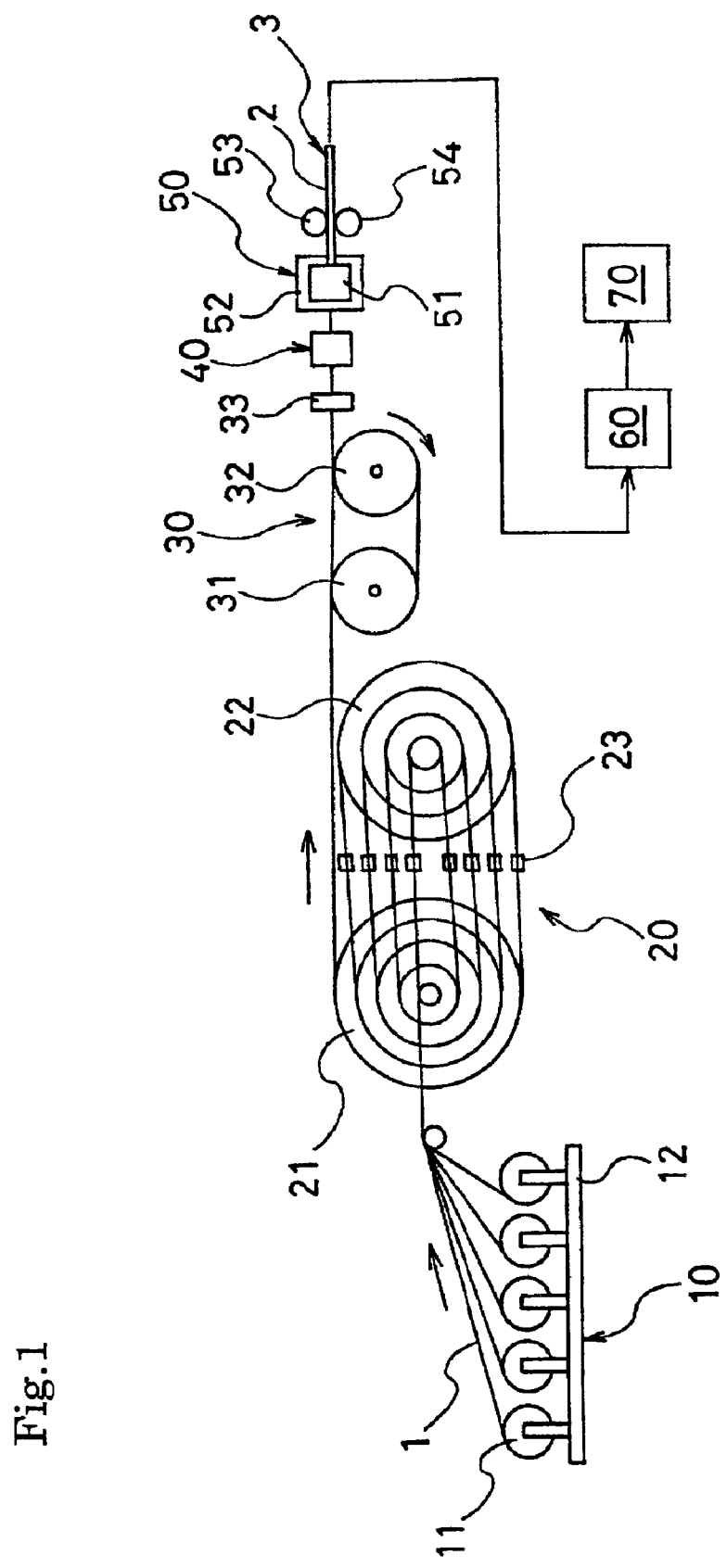
FIG. 1 is a side elevation schematically showing an apparatus for producing an unvulcanized-rubber/steel-wire composite according to an embodiment of the present invention.

FIG. 1 shows an apparatus for producing an unvulcanized-rubber/steel-wire composite according to the present invention, and FIGS. 2 to 5 show an essential portion of the apparatus in an enlarged scale. The production apparatus of this embodiment is constructed to include a wire supplier 10, a wire drawer 20, a wire feeder 30, a wire reformer 40, a rubber coater 50 and a band worker 60 and is connected directly to a tire former 70.

The wire supplier 10 is provided with a creel stand 12 for rotatably supporting a plurality of bobbins 11 having steel wires 1 wound thereon, so that the plurality of steel wires 1 may be continuously supplied from those bobbins 11.

Figure 2:
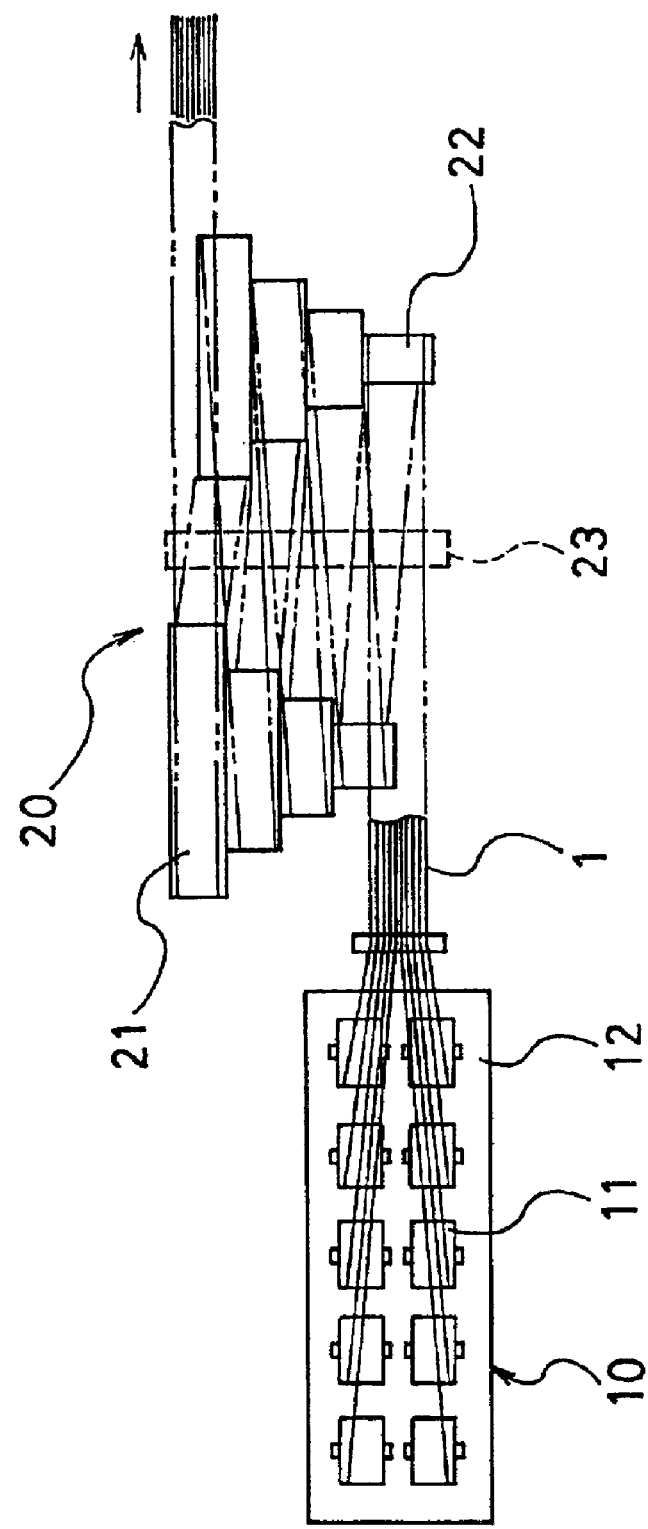
FIG. 2 is a top plan view showing a wire drawer of FIG. 1.

The wire drawer 20 is one multi-die drawer for drawing ten or more steel wires continuously and simultaneously. As shown in FIG. 2, the wire drawer 20 is equipped with a pair of rotary drums 21 and 22 which have external diameters stepwise enlarged and which are arranged in a coaxial direction. The plurality of steel wires 1 are made to run between those rotary drums 21 and 22. More specifically, the plurality of steel wires 1 are transferred sequentially from the smaller diameter sides to the larger diameter sides until they are discharged from the larger diameter side. A number of dies 23 are arranged generally at the center of those rotary drums 21 and 22 and at the positions of passages of the steel wires 1. Here, the rotary drums 21 and 22 and the dies 23 are accommodated in the not-shown bath which is filled with a lubricant.

Figure 3A:
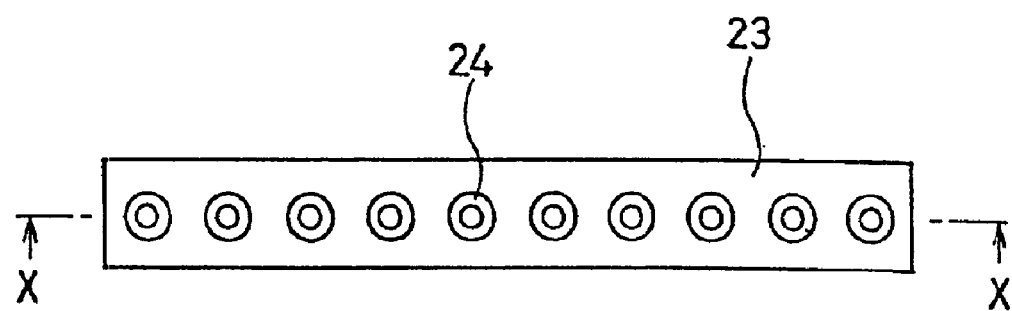
FIG. 3(a) is a front elevation view and FIG. 3(b) is a sectional view taken along line X—X of FIG. 3(a).
Figure 3B:
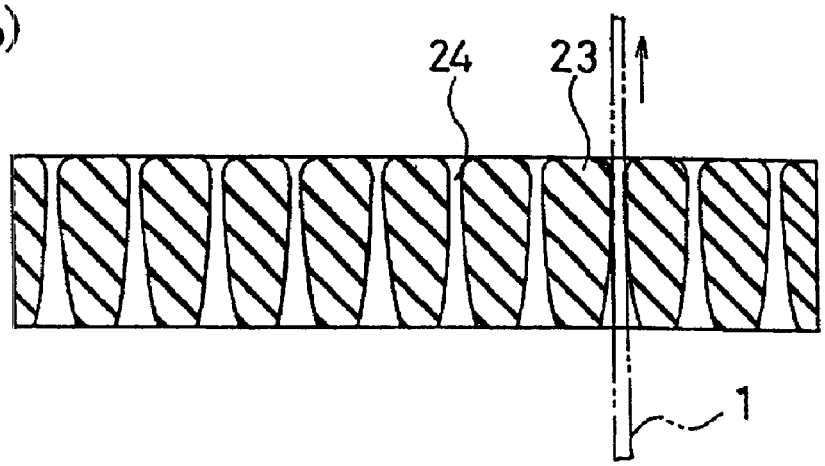

In the dies 23, as shown in FIGS. 3(a) and 3(b), there are opened a plurality of die orifices 24 which are arranged in the longitudinal direction. These die orifices 24 are converged gradually from the entrances to the interiors thereby to thin the steel wires 1 passing therethrough. On the other hand, the die orifices of the multistage dies 23 are internally reduced gradually as the steel wires 1 of the wire drawer 20 advance. As a result, the steel wires 1 are drawn through the multistage dies 23 from a sectional area $D_1$ before drawn to a sectional area $D_2$ after drawn. In this apparatus, the drawing percentage, as expressed by $(D_1-D_2)/D_1 \times 100$ (%), is set to 96% or more. For this high drawing percentage, it is preferred that many stages of the dies 23 are provided for that percentage.

The wire drawer 20 made of the multi-die drawer described above can draw, although given the compact structure, ten or more steel wires continuously and simultaneously and in the high drawing percentage. On the other hand, the wire drawer 20 is set to have a steel wire drawing speed of 80 m/min. or less. This low-speed run does not need a motor of a high capacity but can contribute to a reduction in the whole size of the apparatus.

The wire drawer 20 should not be limited to the aforementioned one multi-die drawer for drawing the ten or more steel wires but may be exemplified either by arranging a plurality of multi-die drawers for drawing three or more steel cords or by arranging a plurality of drawers for drawing one steel cord. In either case, it is arbitrary to select the number of drawers to be arranged for drawing the ten or more steel wires simultaneously.

The wire feeder 30 is composed of a pair of capstans 31 and 32. The plurality of steel wires 1 are made to run on the paired capstans 31 and 32 so that they are extracted from the wire drawer 20 and fed to a next step by the rotational drives of those capstans 31 and 32. Downstream of the capstans 31 and 32, on the other hand, there is arranged a comb-tooth guide 33, by which the intervals of the plurality of steel wires 1 are adjusted.

Figure 4:
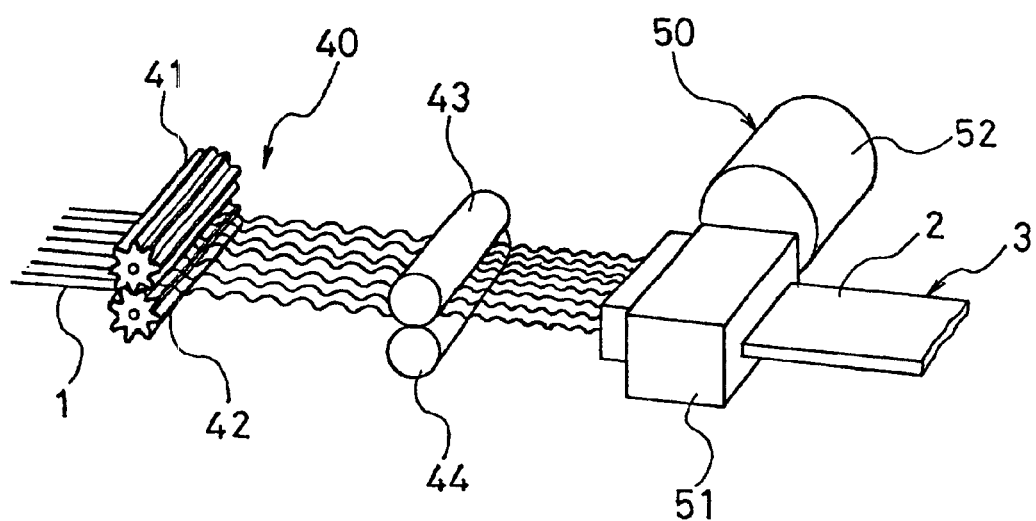
FIG. 4 is a perspective view showing a wire reformer and a rubber coater of FIG. 1.

The wire reformer 40 is equipped, as shown in FIG. 4, with a pair of reforming rolls 41 and 42 having a number of ridges extending in the longitudinal direction on their outer circumferences thereby to reform the plurality of steel wires 1 simultaneously through those reforming rolls 41 and 42. Downstream of these reforming rolls 41 and 42, on the other hand, there are arranged pressure rolls 43 and 44 for arranging the forms of the steel wires 1 in the facial direction. The forms by the wire reformer 40 should not be limited to any special shape but may be suitably selected from undulations, crimps, rectangular shapes or helical shapes according to the final product. For the undulations, crimps or rectangular shapes, all wires are simultaneously reformed after arrayed. For the helical shapes, however, the production apparatus has to be disposed for each wire so that the wires are arrayed after reformed.

The rubber coater 50 is provided with: a head 51 for passing the plurality of steel wires 1 simultaneously therethrough; and an extruder 52 for feeding unvulcanized rubber to around the steel wires 1 in the head 51. From the exit openings of the head 51, therefore, there is discharged a primary composite 3 which is composed of the plurality of steel wires 1 and the unvulcanized rubber 2. This primary composite 3 can have its size set on the basis of the size of the exit openings of the head 51. The primary composite 3 in a strip shape may be given a width of 10 to 50 mm. In the head 51, on the other hand, there are arranged a pair of take-up rolls 53 and 54 for taking up the primary composite 3.

The unvulcanized rubber to be used in the rubber coater 50 can be prepared by blending material rubber such as natural rubber (NR), styrene-butadiene copolymer rubber (SBR) or butadiene rubber (BR) with carbon black, a vulcanizing agent or a vulcanization promoter, although not especially limited thereto. Especially, the adhesiveness between the steel wires and the rubber can be improved by blending a cresol resin, a partial condensate of hexamethylol melamine pentamethylether or a cobalt salt of an organic acid.

Figure 5:
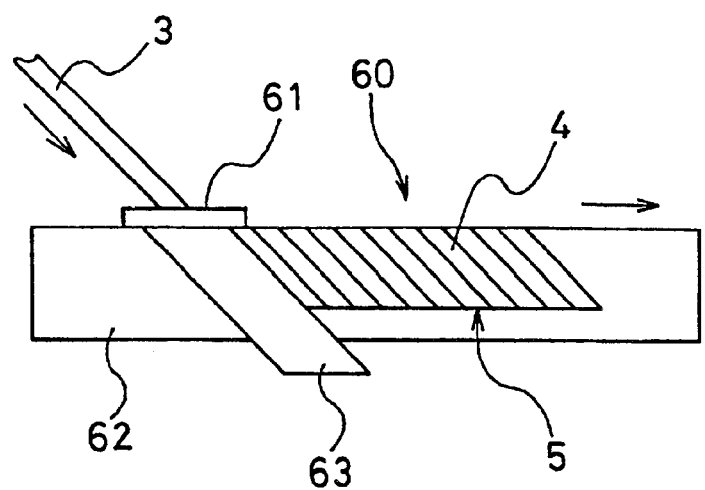
FIG. 5 is a top plan view showing a band worker of FIG. 1.

The band worker 60 forms the primary composite, as fed from the rubber coater 50, into a secondary composite. As shown in FIG. 5, this band worker 60 is composed of: a cutter 61 for cutting the primary composite 3 having passed through the rubber coater 50, at a predetermined angle into a predetermined length; a conveyor 62 for conveying the cuts 4, as made by the cutter 61, by a predetermined length; and a splicer 63 for splicing the plurality of cuts 4 to form a secondary composite 5. The band worker 60 is enabled to set the cutting angle and length arbitrarily by changing the conveyance angle and pitch of the primary composite 3 to the conveyor 62.

The tire former 70 forms an unvulcanized tire by winding the tire components including the belt member, a belt cover member and a carcass member worked by the band worker 60, around the not-shown shaping drum.

Here will be described a method for producing the unvulcanized-rubber/steel-wire composite by using the production apparatus thus far described.

First of all, the plurality of bobbins 11, on which the steel wires 1 plated with brass or zinc are wound, are set in the wire supplier 10, and the plurality of steel wires 1, as let off those bobbins 11, are so set that they may be led continuously to the wire drawer 20, the wire feeder 30, the wire reformer 40 and the rubber coater 50.

Next, the capstans 31 and 32 are rotationally driven to extract the plurality of steel wires 1 continuously from the bobbins 11 so that the plurality of steel wires 1 are simultaneously drawn through the multistage dies 23 in the wire drawer 20 and are fed to the wire reformer 40 without being taken up. Moreover, the plurality of steel wires 1, as drawn in the wire reformer 40, are not taken up but fed to the rubber coater 50, by which they are coated with the unvulcanized rubber 2. As a result, the primary composite 3, as composed of the plurality of steel wires 1 and the unvulcanized rubber 2, is continuously obtained from the rubber coater 50. Here in the drawing work, the drawing speed of the steel wires 1 is set to 80 m/min. or less, and the drawing percentage is set to 96% or more. Where the steel wires 1 have an external diameter of about 5 mm before drawn, for example, the external diameter after the drawing work may be set to 0.15 to 0.20 mm.

The primary composite 3 could be used as it is for forming a product such as a tire or a conveyor belt but is preferably worked according to the structure of the product. Therefore, the primary composite 3 is continuously fed to the band worker 60. In this band worker 60, the primary composite 3 is cut at a predetermined angle to a predetermined length by the cutter 61, and a plurality of cuts 4 are spliced to form the secondary composite 5 by the splicer 63. The size and the cord angle of the secondary composite 5 can be set arbitrarily on the basis of the cutting angle and length of the primary composite 3.

Figure 6:
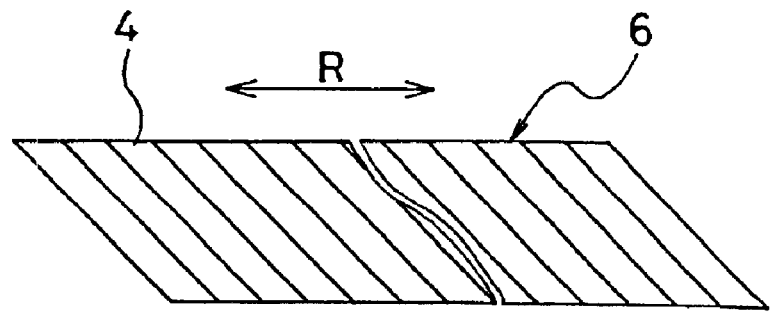
FIG. 6 is a top plan view showing one example of a belt member obtained by the present invention.
Figure 7:
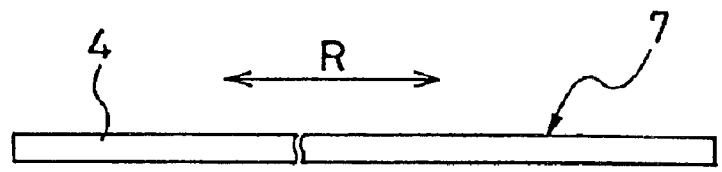
FIG. 7 is a top plan view showing one example of a belt cover member 7 obtained by the present invention.
Figure 8:
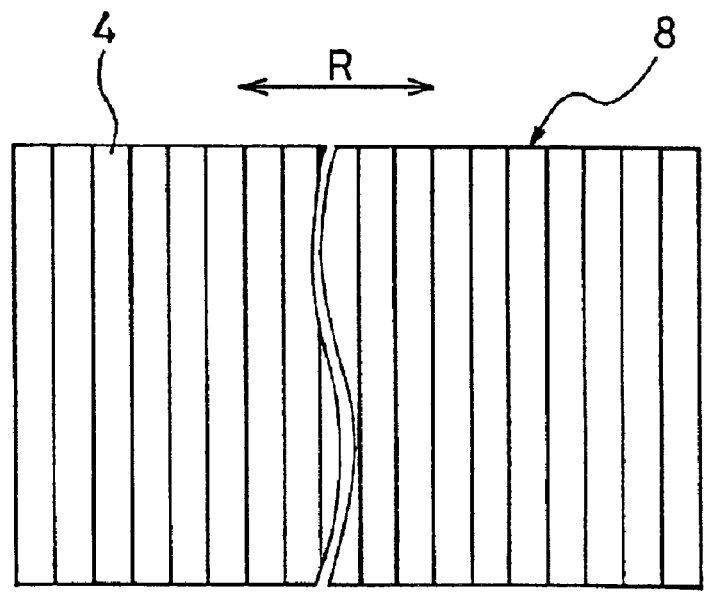
FIG. 8 is a top plan view showing one example of a carcass member obtained by the present invention.

As shown in FIGS. 6 to 8, for example, a belt member 6, a belt cover member 7 and a carcass member 8 can be formed as the tire materials. Where the belt member 6 is to be formed, the plurality of cuts 4, as inclined at a cord angle with respect to a tire circumferential direction R, may be spliced to each other, as shown in FIG. 6. Where the belt cover member 7 is to be formed, the long cuts 4, as prepared to have a cord angle of about 0 degrees with respect to the tire circumferential direction R, are used as they are and may be spirally wound on the outer circumference of the tire forming drum, as shown in FIG. 7. Where the carcass member 8 is to be formed, the plurality of cuts 4, as prepared to have a cord angle of about 90 degrees with respect to the tire circumferential direction R, may be spliced to each other, as shown in FIG. 8.

According to the embodiment thus far described, the plurality of drawn steel wires 1 are not wound up but fed to the rubber coater 50 so that they are coated as they are with the unvulcanized rubber. It is, therefore, possible to omit the winding step after the drawing step, the twisting step, the winding step after the twisting step, the packaging step, the conveying step, the step of mounting the bobbins on the creel, and so on. In other words, the production efficiency has been improved in the prior art by speeding up the individual steps. However, the step of drawing the steel wires, the step of twisting the wires into a cord, the rubber coating step and the composite forming step are isolated from one another. At the ends of the individual steps, the materials have to be taken up to deteriorate the productivity. In the present invention, therefore, in the productions of the primary composite 3 and the secondary composite 5 made of the steel wires 1 and the unvulcanized rubber 2, the steps at least from the drawing step to the rubber coating step are made continuous to eliminate the wasteful steps as many as possible so that the cost for working the unvulcanized-rubber/steel-wire composites can be drastically reduced.

In addition to the aforementioned reduction in the working cost, according to the present invention, it is possible to improve the physical properties of the primary composite 3 and the secondary composite 5. Specifically, the drawing work of the steel wires 1 is performed at such a low drawing speed of 80 m/min. or less as to synchronize with the rubber coating so that the heat to be generated when the steel wires 1 slide on the die faces of the wire drawer 20 can be suppressed. Even if the drawing percentage is raised to 96% or more, therefore, the steel wires 1 are hardly damaged so that their strength and fatigue-resistance after drawn can be sufficiently retained. If the drawing percentage is raised to 96% or more without lowering the drawing speed, a breakage may occur during the drawing treatment. On the other hand, the oxidation of the wire surfaces due to the heat generation of the dies is suppressed to cause an advantage that the dies can be prevented from being worn by an oxide (e.g., zinc oxide) of a high hardness, to elongate the lifetime of the dies. Moreover, since the drawing percentage is raised, the external diameter of the wires before drawn can be set to a large value to cause another advantage that the efficiency in the previous heat treatment or the plating treatment can be improved.

On the other hand, the drawn steel wires 1 are subjected, as they are activated at their plated layer surfaces just after extended, to the coating treatment with rubber so that they can be avoided from having oxides produced on their surface layers. It is, therefore, possible to improve the adhesiveness between the wires and the rubber after vulcanized. In the prior art, more specifically, the humidity of the place for stocking the steel cords is adjusted to prevent the production of the oxides, but this stocking management can be omitted.

Usually, a cord having about two to nine steel wires twisted is employed as the member for reinforcing pneumatic tires for automobiles. In the present invention, however, the steel wires 1 are used solely as they are as the reinforcing member. The steel wires 1 may be used as they are linear without being reformed, but may be reformed, as described above, to reduce the distortion on the wire surfaces due to the compression deformation at the tire running time. By these reforming works, the steel wires 1 themselves can be effectively employed as the reinforcing member of the tire.

EXAMPLES

From the starting material of a steel cord having been subjected to a heat treatment and a brass-plating treatment and having a carbon content of 0.82 wt. %, there were produced the unvulcanized-rubber/steel-wire composites on the basis of Examples 1 to 4 and Comparison in which the working conditions were made variously different, as enumerated in the following Table 1.

Embodiment 1 to 4:

By using the production apparatus shown in FIG. 1, a plurality of steel wires were drawn continuously and simultaneously and were not taken up but arrayed and fed to the rubber coater so that they were coated with the unvulcanized rubber to produce the unvulcanized-rubber/steel-wire composites. Here, the wire diameters before drawn and the drawing speeds were changed to make the drawing percentages variously different. In order to increase the drawing percentages, on the other hand, the number of stages of the drawing dies were changed according to the drawing percentages.

Comparison:

By using the well-known drawer of the single die, the steel wires were drawn and were then taken up and stocked. After one week, the plurality of drawn steel wires were arrayed and fed to the rubber coater so that they were coated with rubber to produce the unvulcanized-rubber/steel-wire composite.

On the Examples 1 to 4 and the Comparison thus produced, the steel wires just before coated with the rubber were sampled to measure their breaking strengths and their fatigue lifetimes. These fatigue lifetimes were measured by applying a bending deformation to the wire samples and by counting the number of times till the breakage occurred. The evaluation results were indicated for the logarithmic value of the breaking lifetimes by the index value with the Comparison set as 100. The fatigue resistance is the more excellent for the larger index value.

On the Examples 1 to 4 and the Comparison, on the other hand, the unvulcanized-rubber/steel-wire composites were vulcanized to evaluate the adhesiveness between the wires and the rubber in the vulcanized composites. These adhesiveness values were measured in terms of the forces necessary for peeling one steel wire from the composites. The evaluation results were indicated by the index value with the Comparison set as 100. The adhesiveness between the wires and the rubber is the more excellent for the larger index value.

TABLE 1

|  | Comp. | Ex.1 | Ex.2 | Ex.3 | Ex.4 |
| --- | --- | --- | --- | --- | --- |
| Wire Diameter (mm) [before drawing] | 1.0 | 1.20 | 1.30 | 1.35 | 1.40 |
| Wire Diameter (mm) [after drawing] | 0.20 | 0.20 | 0.20 | 0.20 | 0.20 |
| Drawing Percentage (%) | 96.0 | 97.2 | 97.6 | 97.8 | 98.0 |
| Drawing Speed (m/min.) | 600 | 80 | 50 | 30 | 30 |
| Breaking Strength (MPa) | 3136 | 3626 | 3724 | 3822 | 3920 |
| Fatigue Lifetime (Index) | 100 | 120 | 125 | 135 | 140 |
| Adhesiveness (Index) | 100 | 110 | 115 | 115 | 120 |

As seen from this Table 1, the Examples 1 to 4 were excellent, although having the high drawing percentages of the steel wires, not only in the strength and the fatigue resistance of the steel wires but also on the adhesiveness between the wires and the rubber. It is quite natural that the Examples 1 to 4 can suppress their working costs because they produced the unvulcanized-rubber/steel-wire composites continuously from the drawing step to the rubber coating step.

INDUSTRIAL APPLICABILITY

According to the present invention, as has been described hereinbefore, the steel wires are continuously drawn, and the drawn steel wires are not taken up but fed to the rubber coater so that they are coated with the unvulcanized rubber. Therefore, it is possible to reduce the working cost drastically and to improve the fatigue resistance of the steel wires and the adhesiveness between the wires and the rubber.

What is claimed is:

1. A method for producing an unvulcanized-rubber/steel-wire composite for tires, comprising the steps of:

drawing a plurality of brass plated steel wires continuously to reduce the sectional area for each of the steel wires to form drawn steel wires, wherein a drawing speed of said drawn steel wires is 80 m/min. or less;

feeding said drawn steel wires to a rubber coater without taking up said drawn steel wires;

coating said drawn steel wires with unvulcanized rubber to form a primary composite;

cutting said primary composite at a predetermined angle to a predetermined length to form strips having side edges and cut ends; and splicing the side edges of the strips to each other to form a secondary composite.

2. An unvulcanized-rubber/steel-wire composite producing method as set forth in claim 1, wherein said reducing step includes drawing said plurality of steel wires continuously and simultaneously; and wherein prior to said step of feeding, the method further comprises arraying said drawn steel wires without taking up said drawn steel wires.

3. An unvulcanized-rubber/steel wire composite producing method as set forth in claim 1 or 2, wherein:

a drawing percentage of said drawn steel wires is 96% or more.

4. An unvulcanized-rubber/steel wire composite producing method as set forth in claim 1 or 2, wherein prior to said step of feeding, the method further comprises the step of:

leading said drawn steel wires to a wire reformer to reform said drawn steel wires without taking up said drawn steel wires.

5. A system for producing an unvulcanized-rubber/steel-wire composite for tires, characterized by comprising:

a plurality of brass plated steel wires;

a wire drawer for drawing the plurality of steel wires continuously to reduce the sectional area for each of the steel wires to form drawn steel wires, wherein a drawing speed of said drawn steel wires is 80 m/min or less;

a rubber coater for coating said drawn steel wires with unvulcanized rubber to form a primary composite, said drawn steel wires being fed to said rubber coater without being taken up;

a band worker including a cutter for cutting said primary composite at a predetermined angle to a predetermined length to form strips having side edges and cut ends; and a splicer for splicing the side edges of the strips to each other to form a secondary composite.

6. An unvulcanized-rubber/steel-wire composite producing system as set forth in claim 5, wherein:

a plurality of drawers are arranged as said wire drawer in parallel so that the plurality of steel wires drawn by said drawers are not taken up but are arrayed and fed to said rubber coater.

7. An unvulcanized-rubber/steel-wire composite producing system as set forth in claim 5, further comprising:

at least one multi-die drawer for drawing three or more steel wires continuously and simultaneously provided as said wire drawer so that the plurality of steel wires drawn by said multi-die drawer are not taken up but are arrayed and fed to said rubber coater.

8. An unvulcanized-rubber/steel-wire composite producing system as set forth in any of claims 5 to 7, wherein:

a drawing percentage of said drawn steel wires is 96% or more.

9. An unvulcanized-rubber/steel-wire composite producing system set forth in any of claims 5 to 7, further comprising:

a wire reformer interposed between said wire drawer and said rubber coater for reforming said drawn steel wires.

* * * * *